Sept. 21, 1971      D. P. SMITH      3,606,828
POPPING APPARATUS
Filed May 14, 1970      2 Sheets-Sheet 2
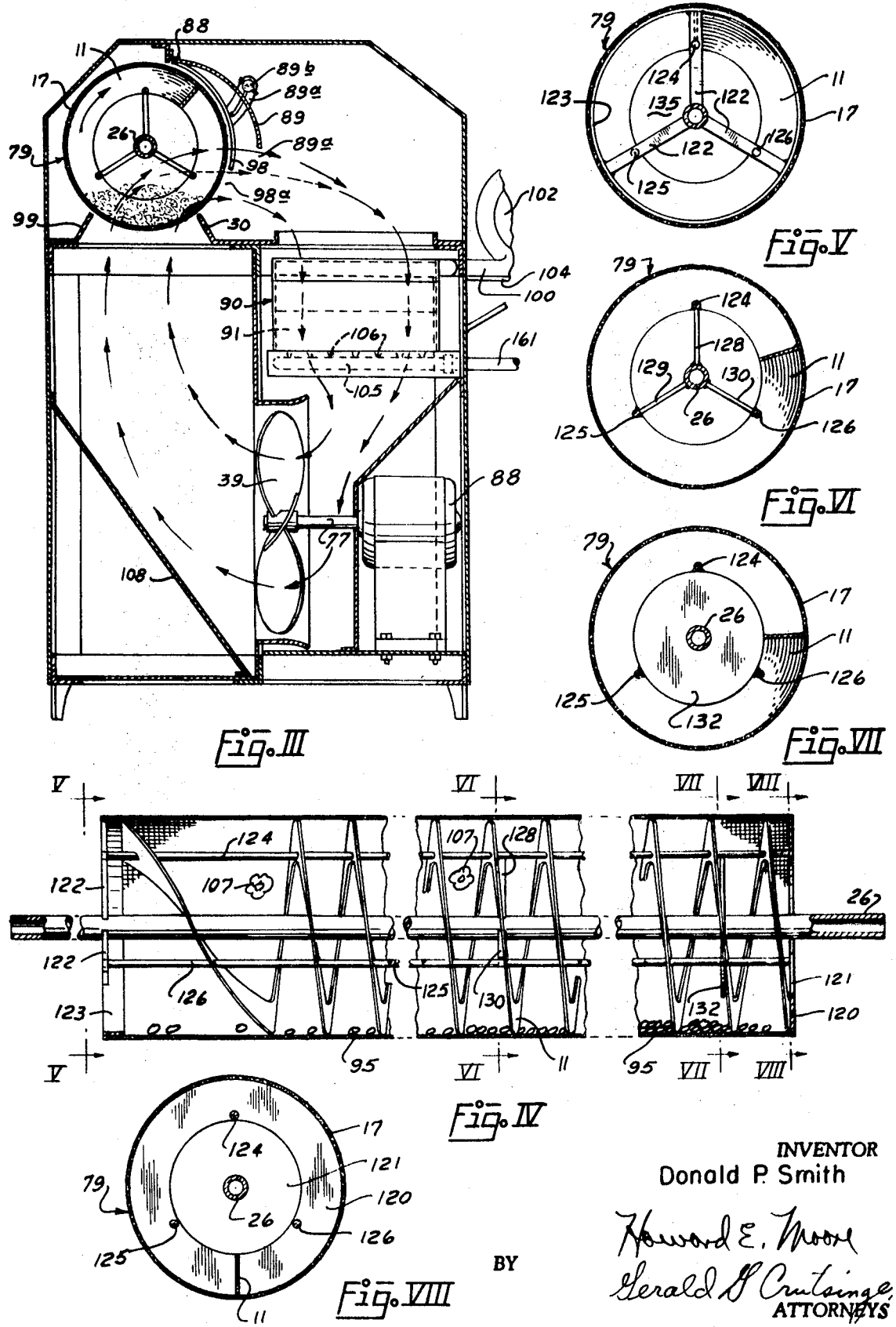
INVENTOR
Donald P. Smith
ATTORNEYS United States Patent Office 3,606,828
Patented Sept. 21, 1971

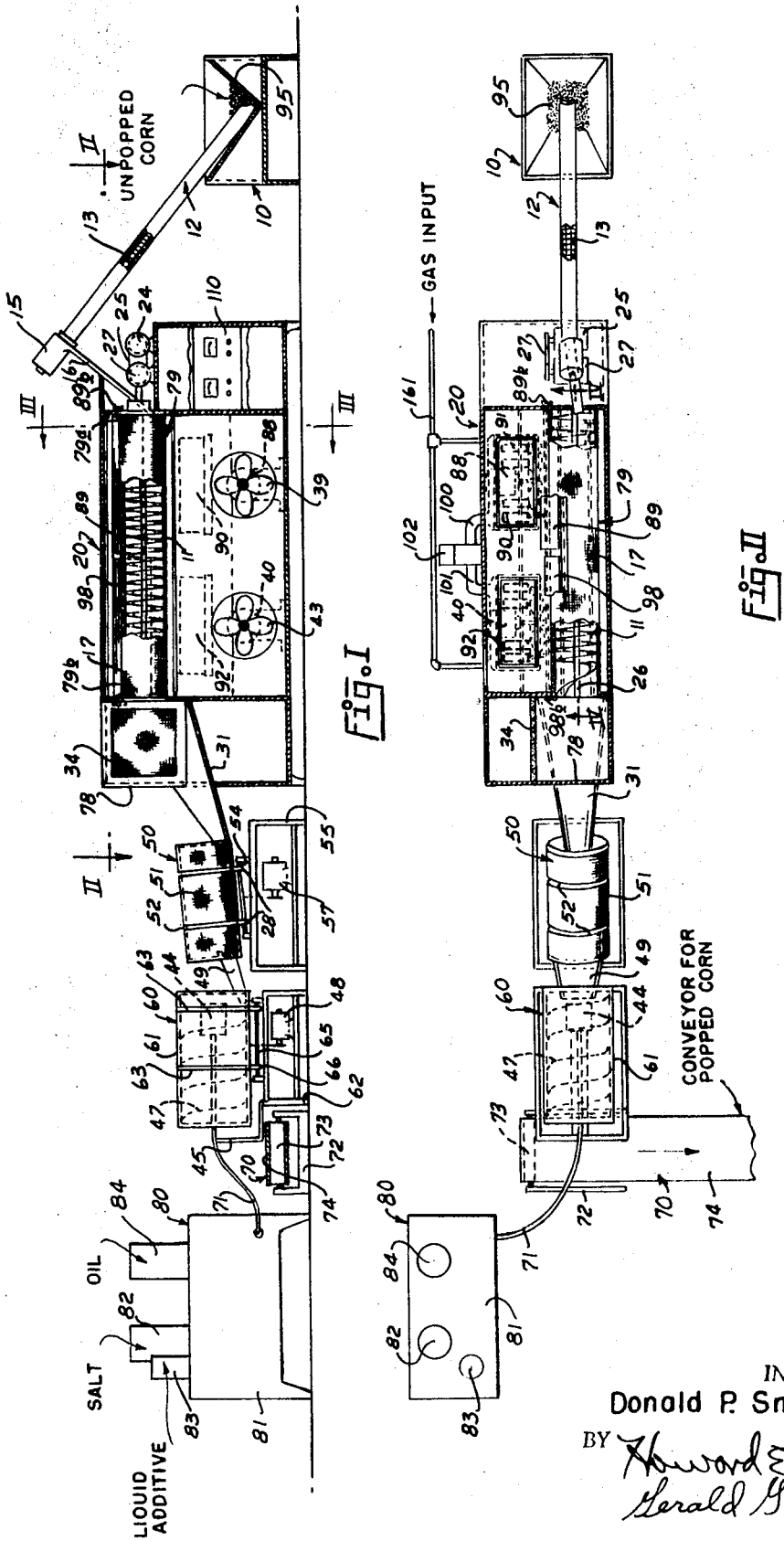

3,606,828
POPPING APPARATUS
Donald P. Smith, 4530 Woodfin Drive,
Dalllas, Tex. 75220
Continuation-in-part of application Ser. No. 516,838,
Dec. 28, 1965. This application May 14, 1970,
Ser. No. 37,136
Int. Cl. A23l 1/18
U.S. Cl. 99—238.5                          8 Claims

ABSTRACT OF THE DISCLOSURE

Apparatus for continuously and positively conveying poppable material through a heating compartment wherein the material is popped and immediately removed from the heating compartment. A conveyor positively feeds the material through the heating compartment and baffles are employed in the heating compartment to regulate the temperature at specified locations throughout the length of the heating compartment. Air pressure is employed for immediately removing popped material from the popping apparatus.

CROSS-REFERENCE TO RELATED PATENTS

This is a continuation-in-part of my copending application Ser. No. 516,838, Dec. 28, 1965, now Pat. No. 3,512,-989, dated May 19, 1970.

BACKGROUND OF INVENTION

In the apparatus which has previously been proposed for the popping of popcorn and other food materials, the resultant product has in many cases been incompletely popped and is often burned and only partially popped. In addition, wastage is high and the complete popping which should produce a light and uniformly tasty product is not achieved. Many of the prior art devices for popping corn employ a single heat source and rely on a relatively low velocity air stream to apply heat to the popcorn. The temperature in the air stream frequently reaches 500° F. to over 1,000° F. in order to heat the popcorn sufficiently rapidly that it will not dry out and become burned by long exposure to the heat. Thus, if a low temperature just over the popping temperature of about 400° F. to 475° F. were employed, the time required to reach popping temperature would be so great that the kernel would lose a great deal of moisture through the open germ end of the kernel, and would pop poorly. When the very high temperatures of 500° F. to over 1,000° F. are used, a high temperature gradient is set up through the kernels of corn and the outer portion of the kernel may reach popping temperature before the entire kernel is properly preheated. This results in incompletely popped corn. In addition, the outer portion of the kernel may be burned prior to popping because of the very high temperature.

A principal object of the present invention is to avoid incomplete popping and burning of food materials as they are popped, and to increase the uniformity and quality of high production popping systems.

Another object of the invention is to provide popping apparatus wherein the temperature along the length of the heating compartment is controlled to provide optimum popping temperatures and control of heating rates.

A further object of the invention is to provide popping apparatus in which poppable material is positively moved through the heating compartment at a controlled rate.

A still further object of the invention is to provide popping apparatus adapted to direct currents of heated gas longitudinally through the heating compartment toward the outlet end thereof for removing popped material from the heating compartment.

SUMMARY OF INVENTION

The foregoing objects are achieved through the use of a continuous popping apparatus including a heating compartment with baffles formed in the walls thereof to provide control of heat at specific locations along the length of the compartment.

As hereinbefore stated, the critical temperatures for the popping of corn are in the vicinity of 400° F. to 500° F. Specifically. I have found that popcorn can be superheated to temperatures approximating 390° F. However, when any portion of the kernel reaches 410° F., the entire unit pops. While there is much variation in the threshold of popping between different strains of popcorn and different kernels of the same strain, rarely does popping occur below 340° F., and most kernels do not pop until they are at a temperature of over 390° F. In accordance with an illustrative embodiment of my invention applicable to the popping of corn, the inlet end of the popping apparatus is maintained at a temperature of over 260° F. but not exceeding 410° F., and preferably between 300° F. and 390° F. Adjacent the outlet end of the heating apparatus, the temperature is maintained at a temperature of 390° F. to 530° F., and preferably between 410° F. and 475° F., until the popcorn is popped. More generally, for food material other than popcorn the temperature range adjacent the inlet end of the heating compartment should be about two-thirds of the popping temperature or less, while the popping temperature should range upward to one and one-third times the actual popping temperature.

I have also discovered that it is important to have the popcorn positively moved through the heating compartment and to have it fully exposed to the temperature along the length of the heating compartment. In accordance with an illustrated embodiment of my invention, this is achieved by the use of a rotating perforated tube having spiral convolutes therein in the heating compartment through which the corn is moved. In addition, high velocity streams of hot air are applied to the popcorn as it is moved through the compartment so that all of the corn reaches the desired temperature at a desired rate and little wastage occurs. To achieve the desired full heating of the corn to the desired temperature, air streams of velocity of more than three hundred and preferably more than five hundred feet per minute are applied to the material to be popped. With regard to timing, it has been determined that a period of one to one-and-one-half minutes in the inlet or preheating section, and a period of from one-half to two minutes in the outlet or popping section of the apparatus are desirable.

In the disclosed illustrative embodiment of the apparatus, baffles are provided to constrain circulating air to flow through the perforated tube, and suitable fans are provided for imparting the higher velocity to the circulating air. In the inlet section of the heating compartment, the air is directed to the lower portion of the rotating tube through which the material to be popped is moved, and the air is permitted to substantially freely escape from the other sides of the perforated tube. In the outer end or popping section, however, it is desirable that the baffle partly enclose the upper surface of the rotating perforated tube so that air carries the popped corn toward the exit chute of the apparatus. The heavier unpopped kernels remain within the tube for the full timing cycle. This last mentioned mode of operation is accomplished through the use of narrow helical vanes on the inner surface of the rotating perforated tube. Once the kernels have popped, thereby reducing their density to a level sufficient to be elevated by the high velocity air, they are expelled by the hot air along the length of the tube to its exit end over the narrow peripheral vanes. In this way, the popped kernels are moved promptly from the heating zone immediately after they are popped.

The hot air is preferably heated through one or more heat exchangers to avoid the burned or gassy taste which is characteristic of food produced by open flame poppers.

Following the popping step the corn is routed through a rotating cylindrical screen having openings large enough to pass unpopped kernels of corn.

In accordance with another aspect of the invention, the corn is then seasoned in an apparatus including an outer cylindrical drum having relatively narrow helical vanes and an open central region. As the cylinder is rotated to move the popped corn along its length and to tumble the popcorn, seasoning is sprayed onto the corn. In accordance with an illustrative seasoning apparatus shown in the drawings, a brush (more specifically described in my copending application Ser. No. 516,838, now Pat. No. 3,512,989, and incorporated herein by reference thereto) rotating at high speed may be mounted within or adjacent to the rotating cylinder to spray any desired solution, such as seasoning, coloring or the like, onto the popped corn.

The novel features which are believed to be characteristic of the invention, both as to its organization and method of operation, together with further objects and advantages thereof, will be better understood from the following description considered in connection with the accompanying drawings in which an illustrative system embodying the principles of the invention is illustrated by way of example. It is to be expressly understood, however, that the drawings are for the purpose of illustration and description only, and are not intended as a definition of the limits of the invention.

DESCRIPTION OF DRAWINGS

Drawings of a preferred embodiment of the invention are annexed thereto so that the invention may be better and more fully understood, in which:

FIG. I is a cross-sectional view of the popping apparatus taken substantially along line I—I of FIG. II;

FIG. II is a cross-sectional view taken substantially along line II—II of FIG. I;

FIG. III is a cross-sectional view taken substantially along line III—III of FIG. I;

FIG. IV is a cross-sectional view taken substantially along line IV—IV of FIG. II;

FIG. V is a cross-sectional view taken substantially along line V—V of FIG. IV;

FIG. VI is a cross-sectional view taken substantially along line VI—VI of FIG. IV;

FIG. VII is a cross-sectional view taken substantially along line VII—VII of FIG. IV; and FIG. VIII is a cross-sectional view taken substantially along line VIII—VIII of FIG. IV.

Numeral references are employed to designate like parts throughout the various figures of the drawing.

DESCRIPTION OF A PREFERRED EMBODIMENT

Referring now to the drawings, there is shown in FIGS. I and II a system for continuously producing popcorn, or other popped products, from unpopped kernels including hopper 10 in which unpopped corn 95 is kept. A conveyor 12 including an Archimedes screw 13 draws the unpopped corn 95 from the hopper 10 and deposits it within a popper apparatus 20 of the system. The unpopped corn 95, as it is conveyed through the popper apparatus 20, is first preheated to a first predetermined temperature and, then, heated further to a second predetermined temperature greater than the first temperature. This can be accomplished by employing separate preheating and popping zones, as described in application Ser. No. 516,838, or by controlled movement through single heat compartment. The grain moves through the popper apparatus 20 until the grain has popped forming popcorn or until a predetermined time period has lapsed. In either event, the popcorn and the residue of unpopped corn 95 moves from the popper apparatus 20 through a chute 31 to a sifter 50, wherein the residue of unpopped corn 95 is separated from the popped corn. The popped corn is expelled from the sifter 50 through a chute 49 into a seasoning apparatus 60. In the seasoning apparatus 60, the kernels of popped corn are sprayed by a seasoning dispenser 44 with a seasoning mixture prepared in and pumped from a seasoning blender 80. The seasoned popcorn is conveyed through the seasoning apparatus 60 and then expelled from the end thereof onto a conveyor 70 which leads to packaging machines (not shown) that prepare the popped corn in boxes for shipment and sale.

Referring now in greater detail to the popcorn producing system illustrated in FIGS. I and II, it may be seen that a motor 15 turns the Archimedes screw 13 so that the Archimedes screw will pick up the unpopped corn 95 from the hopper 10. The unpopped corn 95 is conveyed from the hopper 10 to the top of the conveyor 12 where the unpopped corn is dropped through a chute 16 into an agitating tube 79 within the popper apparatus 20. The tube 79, constructed of wire mesh 17 in the illustrated embodiment, has a plurality of perforations extending through the wall thereof. The perforations are smaller in size than the kernels of unpopped corn 95.

A spiral conveyor 11, best illustrated in FIG. IV, is positioned on the inside peripheral surface of the tube 79 for moving the unpopped corn 95 from the inlet end 79a of the tube 79 to the outlet end 79b thereof (from right to left, as shown in the drawings). A shaft 26 projects through the tube 79 and is connected thereto. A motor 24 is coupled through suitable power transmission means, such as belt drive 25 and speed reducer 27, to the shaft 26 for rotating the shaft 26 thereby rotating the agitating tube 79.

The speed of rotation of the agitating tube 79 is adjusted so that the spiral conveyor 11 will positively move the unpopped corn 95 through a preheating section of the popper apparatus 20 for a period of one to one-and-one-half minutes and, then, through a popping section of the popper apparatus 20 for a period of one-half to two minutes. During these time periods, in the preheating section of the popper apparatus 20 the unpopped kernels of corn 95 are subjected to a stream of hot air having a velocity of over 500 feet per minute and a temperature of greater than 300° F. but not exceeding 410° F.

Air within the inlet end or preheating section of the popper apparatus 20 is heated by a heat exchanger 90, best illustrated in FIG. III, which generally comprises a downdraft furnace unit, such as one manufactured by the Folsom Furnace Company of Dallas, Tex., which comprises a number of heat exchange tubes 91 which are heated by an internal gas flame. Air is drawn past the heat exchange tubes 91 by a fan 39 which may be one of a number of suitable types, such as an elbow fan, size 19–E, manufactured by the L. J. Wing Manufacturing Company of Linden, N.J.

Attention is directed to FIG. III where there is shown a cross-section of the popper apparatus 20 taken through the inlet or preheating section thereof. The fan 39 is mounted on one end of shaft 77 of motor 88 such that when said motor is energized the fan moves heated air. The heat exchanger unit 90 includes a casting 105 in which a number of gas jets 106 are provided. Gas is supplied through a pipe 161 connected to the casting 105, for a gas flame at the gas jets 106. Fumes and heat from the flame pass through the plurality of heat exchanger tubes 91 to an exhaust manifold 100. The exhaust manifold 100 is connected to a blower 102 which is mounted on a platform 104 and which draws the fumes and heat from the gas jets 106 through the heat exchanger tubes 91 and exhausts the fumes.

Thus, air drawn by the fan 39 through the heat exchanger unit 90 may be elevated to a predetermined temperature, for example over 300° F. but not exceeding 410° F. This temperature is constantly monitored by standard, well-known temperature measuring and control devices on a control panel 110 (shown in FIG. I). The gas flame at the jets 106 is regulated to maintain the air temperature within the selected range. The hot air in the inlet or preheating section is blown by the fan 39 through the perforations in wire mesh 17 in the agitating tube 79. The unpopped corn 95 generally rests in the bottom of the agitating tube 79 and is continually moved at a controlled rate longitudinally by the rotation of the agitating tube.

A baffle 99 and a baffle 30 direct the heated air from the fan 39 toward the bottom of the agitating tube 79 where the unpopped corn 95 is being moved by the spiral conveyor 11. The hot air in the inlet section uniformly heats all kernels of the unpopped corn 95 for a controlled time to a temperature just below their popping temperature, generally above 390° F.

One skilled in the art will appreciate that air is allowed to pass from the inlet end section toward the outlet section within the tube 79 so that kernels of corn which are popped in the popping section of the popper apparatus 20 are not blown back into the preheating section through the tube 79 by high velocity air in the popping section.

After the unpopped corn 95 has passed from the inlet end 79a of the tube 79 to a location in the tube 79 in a central portion thereof, each kernel of unpopped corn 94 has been uniformly preheated to a temperature just below its popping temperature. The preheating temperature of the kernels, as measured on the average of the mass of the kernels, does not exceed 390° F. and the time of preheating does not exceed one-and-one-half minutes. These conditions are within the ranges outlined above and typically cannot pop representative popcorn. However, such temperatures bring the kernels of unpopped corn 95 up to a temperature such that any greater temperature applied to the kernels will cause them to pop. And, in fact, the kernels of unpopped corn 95 are conveyed by the spiral conveyor 11 within the tube 79 from the inlet or preheating section to the outlet or popping section of the popping apparatus 20.

In the popping section in the outlet end of the tube 79, the kernels of unpopped corn 95 are moved and agitated by the rotation of the tube 79. The kernels are subjected to a stream of air having a velocity which is sufficient to lift popped kernels and pneumatically move them toward and through the outlet of the tube. Air having a velocity of 500 feet per minute and a temperature of between 400° F. and 475° F. is desirable for popping corn. Generally, the kernels are subjected to these popping conditions for a period of time of between one-half and two minutes. The high velocity stream of hot air in the popping section adjacent the outlet end of tube 79 is produced by apparatus similar to that found in the preheating section illustrated in FIG. III. A heat exchange unit 92, as shown in FIGS. I and II heats the air which is drawn by a fan 43 down through the heat exchange unit 92 and blown up through the perforations in wire mesh 17 in the tube 79. The fan 43 is driven by an electric motor 40, having a shaft 76 upon which fan 43 is mounted.

Air from the fan 43 is directed towards the bottom of the tube 79 where the kernels of unpopped corn 95 are being agitated and tumbled by the rotation of the tube 79 and the high velocity air coming through the preforations 17. A baffle 108 is mounted beneath the tube 79 in the heating chamber and in front of fan 39 and fan 43 for directing hot air moved by the fan 39 and fan 43 upwardly to tube 79.

In the inlet end of the heating compartment, tube 79 is partially surrounded by a solid baffle 89 pivotally connected by hinge 88 to the inside of the top of the heating compartment. A majority of the air passing upwardly through the perforations in wire mesh 17 in the bottom of the inlet section of tube 79 may be allowed to pass through perforations in wire mesh 17 on the opposite side of the tube 79 through the opening 89a beneath baffle 89 and back to the heat exchanger 92. It should be noted, however, that some of the air directed by the fan 43 through perforations 17 in the bottom of the tube 79 passes out the outlet end of the tube 79 taking with it those kernels of corn which have popped.

It should be noted that if baffle 89 or baffle 98 in the outlet end of the tube were closed, substantially all of the air from fan 39 or fan 43 would be directed toward the outlet end 79b of tube 79. However, if baffle 89 or baffle 98 were raised, substantially all of the air from fan 39 or fan 43 would pass through opening 89a or opening 98a. The manipulation of baffles 89 and 98 control direction and pressure delivered from fans 39 and 43 through various sections of tube 79.

As the kernels of unpopped corn 95 are subjected to the high velocity stream of hot air in the outlet or popping section (having a velocity of over 500 feet per minute and a temperature of between 400° F. and 475° F.) controlled heat transfer from the hot air to the kernels is achieved. Between the time of one-half to two minutes, the kernels of unpopped corn 95 are heated just enough to trigger a maximum "pop" from the center of the kernel, resulting in a light, white, fluffy popcorn 107 which usually pops up out of the unpopped kernels 95 into the stream of air exiting the output end of the tube 79. Those kernels of unpopped corn 95 which are larger in size, or for other reasons require greater lengths of time to pop, stay in the lower portion of the tube 79 until they do, in fact, pop or until they are conveyed by the spiral conveyor 11 to the end of the tube 79.

As the kernels 95 pop to form the popcorn 107, they are picked by the airstream flowing toward the output end of the tube 79 and are blown out the end 79b of the tube 79. The popcorn 107 so expelled from the tube 79 hits a baffle 78 in line with the tube 79 near the end thereof. Such popcorn kernels then drop onto a chute 31. Those kernels of popcorn 107 which are not expelled from the tube 79 by the airstream, are moved by the spiral conveyor 11 through the popping section until they fall from the outlet end of the tube 79 onto the chute 31. The air which has left the agitating tube 79 through the outlet end thereof returns to the heat exchanger 92 through a screen 34 which prevents popcorn kernels from entering the heat exchanger 92 and yet allows the air to freely pass therethrough so that it may again be heated by passage through the heat exchanger 92.

It should be noted at this time that the heat exchanger 92 is substantially identical to the heat exchanger 90 described above, shown as a downdraft furnace supplied with gas from the gas pipe 161 for a gas flame at a plurality of jets on the casing. Fumes and heat from the gas flame are drawn up through heat exchange tubes and out through an exhaust manifold 101 by the blower 102. The temperature of the air moved from the fan 43 to the tube 79 is sensed and controlled by standard well-known devices, the operating controls of which are mounted on the control panel 110.

Thus, it may be seen that in the heating compartment of the popper apparatus 20 the kernels of unpopped corn 95 are heated in two steps to form the kernels of popcorn 107. In each of the two sections of the popper apparatus 20, high velocity streams of hot air are constrained to flow through perforations in the agitating tube 79 which is positively conveying the unpopped kernels of corn through the popper apparatus 20. In the inlet end section of the popper apparatus 20, each of the kernels of unpopped corn 95 are preheated to a controlled temperature just below their popping temperature by rotating the agitating tube 79 and applying a high velocity stream of hot air from the fan 39. The temperature of the kernels is determined by the heat of the air and the exposure time which is determined by the lead of the convolutions on the inside of tube 79 and the rate of rotation of the tube.

Continued movement of the kernels of unpopped corn 95 in the tube 79 causes them to be subjected to a high velocity stream of hot air at a greater controlled temperature than in the inlet section, if desired, sufficient to trigger the kernels into popping. The kernels of unpopped corn 95 are thereby changed in the outlet section of the apparatus 20 into the kernels of popcorn 107 in a much more efficient manner than has heretofore been proposed.

It has been found, for example, that by maintaining the velocity of the air in the inlet section to 1000 feet per minute, the time of preheating to 105 seconds, the temperature of the preheat section at 385° F., the temperature of the outlet section at 415° F., and an air velocity of 1000 feet per minute in the popping section, the kernels of unpopped corn 95 passing through the agitating tube 79 and subjected to such heating conditions expanded to give popcorn having a final density of 116 grams per gallon. This density is compared to popcorn from the same lot which gave the higher density of 122 grams per gallon when popped in a standard oil popper, such as is used for expansion tests. Moreover, waste was found to be less than two percent by using the apparatus of the present invention.

As best illustrated in FIGS. IV through VIII of the drawing, agitator tube 79 comprises a spiral conveyor 11, such as spirally twisted vanes, secured to wire mesh 17 and shaft 26 by suitable supporting members. The spacing between vanes may be varied, as illustrated in the outlet end 79b of tube 79, to move kernels at varying rates through different segments of the heating chamber.

Referring to FIGS. IV and VIII, the inlet end 79a of agitator tube 79 has an end wall 120 having an opening 121 formed in a central portion thereof and wire mesh 17 is secured to the outer edge of the end wall 120 as by welding.

Referring to FIGS. IV and V, it should be noted that the outlet end 79b of agitator tube 79 has support members 122 extending radially outwardly from shaft 26, the outer ends thereof being secured to sifter ring 123 which is welded or otherwise secured to wire mesh 17.

Tie rods 124, 125 and 126 extend longitudinally through agitator tube 79 and have opposite ends secured to end wall 120 and support members 122. It should be noted that tie bars 124, 125 and 126 are secured to the flights or vanes of spiral conveyor 11 to secure spiral conveyor relative to wire mesh 17.

As best illustrated in FIGS. IV and VI of the drawing, support members 128, 129 and 130 extend between tie bars 124, 125 and 126, respectively, and shaft 26 for maintaining said tie bars in space bar relation around shaft 26.

Referring to FIGS. IV and VII, deflector plate 122 is secured to shaft 26 adjacent to the inlet end of agitator tube 79 and is secured to tie bars 124, 125 and 126. Deflector plate 132 is aligned longitudinally in agitator tube 79 with opening 121 at the inlet end 79a of the agitator tube to deflect heated air circulated through wire mesh 17 away from opening 121 in inlet end of agitator tube.

From the foregoing it should be readily apparent that rotation of shaft 26 causes granular material, deposited through opening 121, to move longitudinally through agitator tube 79 at a predetermined rate.

It should be noted that since spiral conveyor 11 and wire mesh 17 are secured together and rotate as a unit, granular material 95 inside the agitating tube 79 is tumbled or agitated as wire mesh 17 moves beneath the granular material moving longitudinally by the spiral conveyor 11. It also should be noted that the spiral conveyor 11 is positioned inside agitator tube 79 so as to form a substantially unobstructed passage 135 centrally of and extending longitudinally through agitator tube 79.

As heretofore described upwardly directed air currents from fan 43 in addition to natural popping characteristics of the material cause the popped material to move upwardly into the unobstructed passage 135 and air currents moving longitudinally through said passage accelerate and move the popped material towards the outlet end of agitating tube 79. However, the vanes on the conveyor 11 restrain longitudinally movement of unpopped kernels 95 to prevent their being blown toward the exit end of tube 79.

The kernels or popcorn 107, together with those few kernels of unpopped corn 95, are blown or dropped, respectively, onto the chute 31 through which they leave the popper apparatus 20 and enter a barrel 51 of the sifter 50. The barrel 51 is constructed of wire screen having apertures therein larger than the kernels of unpopped corn 95 but smaller than the kernels of popcorn 107. The barrel is provided with a pair of roller tracks 52 secured to the outside peripheral surface of the barrel 51. An electric motor 57 is drivingly connected to a shaft 54, supported by trunnions on a frame 55 of the sifter 50. A pair of rollers 28 are mounted on the shaft 54 and frictionally engage the tracks 52 on the barrel 51. Rotation of the rollers 28 by the motor 57 causes the barrel 51 to rotate for separating the residue of unpopped corn 95 from the kernels of popcorn 107. The residue drops through the wire screen, is gathered, and is discarded as waste. Because the barrel 51 is mounted on the frame 55 so that its input end is higher than its output end, thereby providing an inclined internal surface, the kernels of popcorn 107 move through the barrel 51 as it rotates and exit the sifter 50 through a chute 49 which leads to a barrel 61 of the seasoning apparatus 60.

The seasoning apparatus 60 comprises a cylinder forming the barrel 61 having a spiral conveyor on the inside peripheral surface thereof for moving the kernels of popcorn 107 from the chute 49 to the conveyor 70, as shown in FIGS. I and II. The barrel 61 has a pair of roller tracks 63 on the outside peripheral surface of the barrel which frictionally engage a pair of rollers 66 secured to a shaft 65. The shaft 65 is supported by trunnions on a frame 62 of the seasoning apparatus 60, and is coupled to an electric motor 48 for being rotated thereby. Rotation of the rollers 66 by the motor 48 causes the barrel 61 to turn at a slow rate of speed, thereby conveying the kernels of popcorn from the chute 49 to a belt 74 of the conveyor 70.

As illustrated in FIGS. I and II, a cantilevered support arm 45 is coupled to the frame 62 and extends to a location within the barrel 61. The arm 45 supports a seasoning dispenser unit 44 for applying, for example, salt, food coloring and flavoring oil to the kernels of popcorn 107 as they pass through the seasoning apparatus 60. A hose 71 supplies seasoning from the seasoning blender 80 to the seasoning dispenser 44.

The kernels of popcorn 107, having been seasoned within the seasoning apparatus 60, drop from the end of the barrel 61 thereof onto the conveyor belt 74 of the conveyor system 70. As shown in FIGS. I and II, the conveyor belt 74, which is shown to be mounted on an idler pulley 73, coupled to a frame 72, transports the kernels of seasoned popcorn to packaging machines where the popcorn is prepared for shipment and sale.

As noted above, seasoning is applied to the seasoning dispenser 44 by the seasoning blender 80 through the hose 71. In FIGS. I and II the seasoning blender 80 is shown to include a salt drum 82, an oil drum 84, and a liquid additive drum 83, all three of which are mounted on a frame member 81 of the seasoning blender 80. The details of the mechanism for mixing three such seasoning ingredients stored within the above-noted containers are described and illustrated in my copending application Ser. No. 516,838.

Thus, it may be seen that the system described herein for continuously producing superior quality, seasoned popcorn from kernels of unpopped corn and the method therein embodied is a noteworthy improvement over prior art devices and methods employed for the same purpose. It is to be understood, however, that the above-described arrangements are illustrative of the application of the principles of the invention. Numerous other arrangements within the scope of the invention may be devised by those skilled in the art. Thus, by way of example and not of limitation, food products other than popcorn, such as a popped cereal or rind product, may be processed in the apparatus described above. In addition, the structural implementation of the invention may be varied through the use of a vibrating and transversely moving screen-type belt to restrain and carry popcorn through the preheating and popping sections of the popper apparatus 20. Moreover, other mechanical structures for heating the air blown through such a porous agitating belt or through the tube 79 may be used. Other methods of separating the kernels of popcorn 107 from the residual kernels of unpopped corn 95 also may be devised by those skilled in the art to replace the sifter apparatus 50 described above, without departing from the scope of the invention. Accordingly, from the foregoing, it is evident that various changes may be made in the present invention without departing from the spirit of the invention as described in the appended claims.

Having described my invention, I claim:

1. A continuous popping apparatus for material having a predetermined popping temperature comprising in combination:
   a heating section;
   means for maintaining said heating section at a temperature measured in degrees Fahrenheit above the predetermined popping temperature of the material;
   means for positively and continuously moving material to be popped through said heating section at a predetermined rate comprising, an agitator tube having an entrance end and an exit end and perforations through the walls thereof which are smaller in size than the material to be popped; means inside the tube for moving unpopped material from the entrance end of the agitator tube to the exit end thereof;
   means for blowing air through all of said material in the heating section at a high velocity and at a temperature above the popping temperature of the material;
   means for restraining movement of unpopped material at rates greater than said predetermined rates while permitting passage of popped material toward the exit end of said heating section;
   and means for directing air toward the exit end of the agitator tube from said heating section to carry popped food promptly from the heating section after it is popped.

2. The combination called for in claim 1 wherein the means for moving the popped material from the entrance end of the agitator tube to the exit end thereof comprises vanes secured relative to walls of the agitator tube.

3. The combination called for in claim 1 wherein the means for maintaining the heating section at a temperature above the popping temperature comprises heat exchanger means for heating the air blown through the material.

4. The combination called for in claim 1 wherein the means for directing air toward the exit end of the heating section comprises means surrounding a portion of the agitator tube positioned to direct at least a portion of the air blown through the material toward the exit end of the heating section.

5. A continuous popping apparatus comprising:
   a preheating section;
   means for maintaining said preheating section at a preheating temperature just below the temperature required for popping;
   a popping section;
   means for maintaining said popping section at a popping temperature above but not greatly in excess of the temperature required for popping;
   conveyor means for positively and continuously moving material to be popped through said preheating section and through said popping section;
   means on the conveyor means to separate heated material from non-heated material;
   means for blowing air through all of said food material in said preheating section at said preheating temperature; and
   means for blowing air through all of said food material in said popping section at said popping temperature.

6. A material popping apparatus comprising:
   a housing;
   a perforated agitating tube in the housing, said tube having inlet and outlet openings formed therein;
   means to rotate the tube;
   conveyor means on the inner wall of the tube for moving material longitudinally through the tube as said tube rotates, said conveyor means having a central passage therethrough;
   means in heat exchange relation with material in the tube to heat said material as it is moved longitudinally through the tube; and
   means for directing fluid upwardly through perforations in the tube and longitudinally through the tube toward the outlet opening, said fluid moving at a velocity which is sufficient to move popped material into and through the central passage toward the outlet opening.

7. Popping apparatus comprising:
   a general frame;
   a cylinder having perforations in the walls thereof and inlet and outlet openings formed therein;
   substantially helical guide means on the inner surface of the walls of the cylinder and extending inwardly therefrom;
   means to rotatably secure the cylinder relative to the frame;
   means to rotate the cylinder such that the guide means will move unpopped material toward the outlet opening;
   means to heat unpopped material in the cylinder and
   means for blowing fluid through the perforations in the cylinder walls to lift popped material above the guide means and pneumatically move the popped material longitudinally through the cylinder toward the outlet opening.

8. A continuous popping apparatus comprising:
   a substantially horizontally disposed tube having perforations in the walls thereof, said tube having an inlet passage and an outlet passage formed therein;
   vanes secured relative to inner walls of the tube positioned to restrain movement of unpopped material longitudinally of the tube; and
   means to circulate heated air through unpopped material in the tube for heating the material to a popping temperature, said means being adapted to circulate air at a velocity sufficient to lift popped material over the vanes and propel same toward the outlet opening in the tube.

References Cited
UNITED STATES PATENTS

| | | | |
|---|---|---|---|
| 1,021,426 | 3/1912 | Rowan | 99—238.5 |
| 1,868,578 | 7/1932 | Knott | 99—238.6 |

ROBERT W. JENKINS, Primary Examiner

U.S. Cl. X.R.

99—81, 238.4, 238.6